US012368712B2

(12) United States Patent
Cheethirala et al.

(10) Patent No.: US 12,368,712 B2
(45) Date of Patent: Jul. 22, 2025

(54) ORGANIZATION IDENTIFICATION OF NETWORK ACCESS SERVER DEVICES INTO A MULTI-TENANT CLOUD NETWORK ACCESS CONTROL SERVICE

(71) Applicant: Juniper Networks, Inc., Sunnyvale, CA (US)

(72) Inventors: Madhava Rao Cheethirala, San Jose, CA (US); Pavan Kumar Venkata Satish Bharathapudi, San Jose, CA (US); Natarajan Manthiramoorthy, Fremont, CA (US); Pavan Basetty, Fremont, CA (US); Raja Rao Tadimeti, San Jose, CA (US); Viacheslav Dementyev, Brno (CZ)

(73) Assignee: Juniper Networks, Inc., Sunnyvale, CA (US)

( * ) Notice: Subject to any disclaimer, the term of this patent is extended or adjusted under 35 U.S.C. 154(b) by 442 days.

(21) Appl. No.: 17/934,124

(22) Filed: Sep. 21, 2022

(65) Prior Publication Data
US 2023/0403272 A1 Dec. 14, 2023

Related U.S. Application Data

(60) Provisional application No. 63/366,379, filed on Jun. 14, 2022.

(51) Int. Cl.
*H04L 9/40* (2022.01)
*H04L 67/1097* (2022.01)

(52) U.S. Cl.
CPC ...... *H04L 63/0876* (2013.01); *H04L 63/0823* (2013.01); *H04L 63/166* (2013.01); *H04L 67/1097* (2013.01)

(58) Field of Classification Search
CPC ............. H04L 63/0876; H04L 63/0823; H04L 63/166; H04L 67/1097; H04L 63/0272
See application file for complete search history.

(56) References Cited

U.S. PATENT DOCUMENTS 9,455,980 B2 * 9/2016 Xie ..................... H04L 63/0435
9,473,419 B2    10/2016 Brand
(Continued)

FOREIGN PATENT DOCUMENTS

| CN | 118784575 A | * | 10/2024 | |
| WO | WO-2012001362 A1 | * | 1/2012 | ........... H04L 47/825 |
| WO | WO-2022031505 A1 | * | 2/2022 | |

OTHER PUBLICATIONS

Winter et al, TLS encryption for Radius over TCP (RADSEC), Radius Extensions Working Group Internet-Draft, p. 1-17 (Year: 2008).*

(Continued)

*Primary Examiner* — Christopher A Revak
(74) *Attorney, Agent, or Firm* — Shumaker & Sieffert, P.A.

(57) ABSTRACT

A multi-tenant, cloud-hosted Network Access Control (NAC) system may receive an indicator from a Network Access Server (NAS) device to identify the tenant with which the NAS device is associated. The NAS device may put the identifier in the Transport Layer Security (TLS)/Secure Sockets Layer (SSL) extension Server Name Indication (SNI) field. The NAC system may use the identifier to obtain tenant-specific configuration information for setting up a secure tunnel with the NAS device.

20 Claims, 9 Drawing Sheets

(56) References Cited

U.S. PATENT DOCUMENTS

| | | | |
|---|---|---|---|
| 9,832,082 | B2 | 11/2017 | Dade et al. |
| 10,003,600 | B2* | 6/2018 | Karunakaran ...... H04L 63/0815 |
| 10,237,078 | B2 | 3/2019 | Prince et al. |
| 10,554,418 | B2* | 2/2020 | Kshirsagar ............ H04L 9/3268 |
| 10,567,348 | B2* | 2/2020 | Subramaniyan .... H04L 63/0823 |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 11,277,399 | B2* | 3/2022 | Milton ................. H04W 12/069 |
| 11,553,007 | B2* | 1/2023 | Milton .................. H04L 63/205 |
| 12,047,287 | B2* | 7/2024 | Wu ......................... H04L 47/24 |
| 2004/0133679 | A1 | 7/2004 | Kennis et al. |
| 2016/0057133 | A1* | 2/2016 | Ashley .................... H04L 63/20 713/156 |
| 2017/0163624 | A1* | 6/2017 | Mattsson .............. H04W 12/08 |
| 2017/0223054 | A1* | 8/2017 | Wing .................. H04L 63/0281 |
| 2020/0344607 | A1* | 10/2020 | Ericksen ............. H04L 65/1045 |
| 2021/0306201 | A1 | 9/2021 | Wang et al. |
| 2022/0329576 | A1* | 10/2022 | Nikam ................ H04L 63/0272 |

OTHER PUBLICATIONS

"The Ultimate Guide to SSL/TLS Client Authentication: Know How it Works," ABOUTSSL, Accessed May 23, 2022, 8 pp.

Blake-Wilson et al., "Transport Layer Security (TLS) Extensions", Request for Comments 3546, Jun. 2003, 26 pp.

Hunt, "Application Load Balancers Now Support Multiple TLS Certificates With Smart Selection Using SNI", AWS News Blog, Oct. 10, 2017, 4 pp.

Extended Search Report from counterpart European Application No. 22215462.7 dated Nov. 17, 2023, 7 pp.

Response to Extended Search Report dated Nov. 17, 2023, from counterpart European Application No. 22215462.7 filed Jun. 20, 2024, 13 pp.

* cited by examiner

ORGANIZATION IDENTIFICATION OF NETWORK ACCESS SERVER DEVICES INTO A MULTI-TENANT CLOUD NETWORK ACCESS CONTROL SERVICE

This application claims the priority benefit of U.S. Provisional Patent Application Ser. No. 63/366,379, filed Jun. 14, 2022, the entire contents of which is incorporated herein by reference.

TECHNICAL FIELD

The disclosure relates generally to computer networks and, more specifically, to managing access to computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies.

Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible AP. In order to gain access to a wireless network, a wireless client device may first need to authenticate to the AP. Authentication may occur via a handshake exchange between the wireless client device, the AP, and an Authentication, Authorization, and Accounting (AAA) server controlling access at the AP.

SUMMARY

In general, this disclosure describes one or more techniques for identification and validation of a tenant or organization to which a device (e.g., a Network Access Server (NAS) device such as an access point, switch, router, or other network infrastructure device capable of authenticating and authorizing client devices to access an enterprise network) belongs in the context of a multi-tenant, cloud-hosted Network Access Control (NAC) service. The NAC service may be hosted on one or more NAC systems in communication with a centralized, cloud-based network management system (NMS) configured to manage a plurality of NAS devices associated with one or more tenants or organizations.

In accordance with the disclosed techniques, a NAC system uses an indicator included within a request to establish a secure tunnel received from a NAS device. The indicator identifies the tenant or organization to which the NAS device is associated or belongs. In one example, the disclosed techniques may leverage the Transport Layer Security (TLS)/Secure Sockets Layer (SSL) extension Server Name Indication (SNI) for the identification of the tenant or organization. In this example, the request received from the NAS device may comprise a 'client hello' message that includes the SNI value to identify the tenant or organization of the NAS device.

The NAC system may then use the indicator to perform a lookup in a local cache to obtain configuration information for the tenant or organization. The configuration information may include a server certificate associated with the tenant or organization identified by the indicator. If the configuration information for the tenant is not included in the local cache of the NAC system, the NAC system may request the configuration information for the tenant or organization from the cloud-based NMS in a process referred to as a "lazy download."

Once the correct server certificate for the tenant or organization is obtained, the NAC system may provide the server certificate to the NAS device. For example, the NAC system may send a 'server hello' message to the NAS devices as part of a TLS handshake. In response to receipt of a client certificate from the NAS device, the NAC system may validate the client certificate using a certificate authority associated with the tenant or organization. The certificate authority location may be included in the configuration information for the tenant or organization identified by the indicator.

In one example, the disclosure is directed to a system comprising a cloud-based NMS configured to manage a plurality of NAS devices associated with one or more network tenants and one or more cloud-based NAC systems in communication with the NMS. At least one NAC system of the one or more NAC systems is configured to receive a request to establish a secure tunnel from a NAS device of the plurality of NAS devices associated with a network tenant of the one or more network tenants, the request including an indicator to identify the network tenant to which the NAS device belongs; obtain configuration information for the network tenant based on the indicator, the configuration information including a server certificate associated with the network tenant; provide the server certificate to the NAS device in a response to the request; in response to receipt of a client certificate from the NAS device, validate the client certificate using the configuration information for the network tenant; establish the secure tunnel with the NAS device; and provide NAC service to the NAS device using the secure tunnel.

In another example, the disclosure is directed to a method comprising receiving, at a cloud-based NAC system in communication with a cloud-based NMS, a request to establish a secure tunnel from a NAS device of a plurality of NAS devices associated with one or more network tenants, the request including an indicator to identify a network tenant of the one or more network tenants to which the NAS device belongs; obtaining, by the NAC system, configuration information for the network tenant based on the indicator, the configuration information including a server certificate associated with the network tenant; providing, by the NAC system, the server certificate to the NAS device in a response to the request; in response to receiving a client certificate from the NAS device, validating, by the NAC system, the client certificate using the configuration information for the network tenant; establishing, by the NAC system, the secure tunnel with the NAS device; and providing, by the NAC system, NAC service to the NAS device using the secure tunnel.

In an additional example, the disclosure is directed to a computer-readable storage medium comprising instructions that, when executed, cause one or more processors of a cloud-based NAC system in communication with a cloud-based NMS to receive a request to establish a secure tunnel from a NAS device of a plurality of NAS devices associated with one or more network tenants, the request including an indicator to identify a network tenant of the one or more network tenants to which the NAS device belongs; obtain configuration information for the network tenant based on the indicator, the configuration information including a server certificate associated with the network tenant; provide the server certificate to the NAS device in a response to the request; in response to receipt of a client certificate from the NAS device, validate the client certificate using the configuration information for the network tenant; establish the secure tunnel with the NAS device; and provide NAC service to the NAS device using the secure tunnel.

The details of one or more examples of the techniques of this disclosure are set forth in the accompanying drawings and the description below. Other features, objects, and advantages of the techniques will be apparent from the description and drawings and from the claims.

DETAILED DESCRIPTION

Figure 1A:
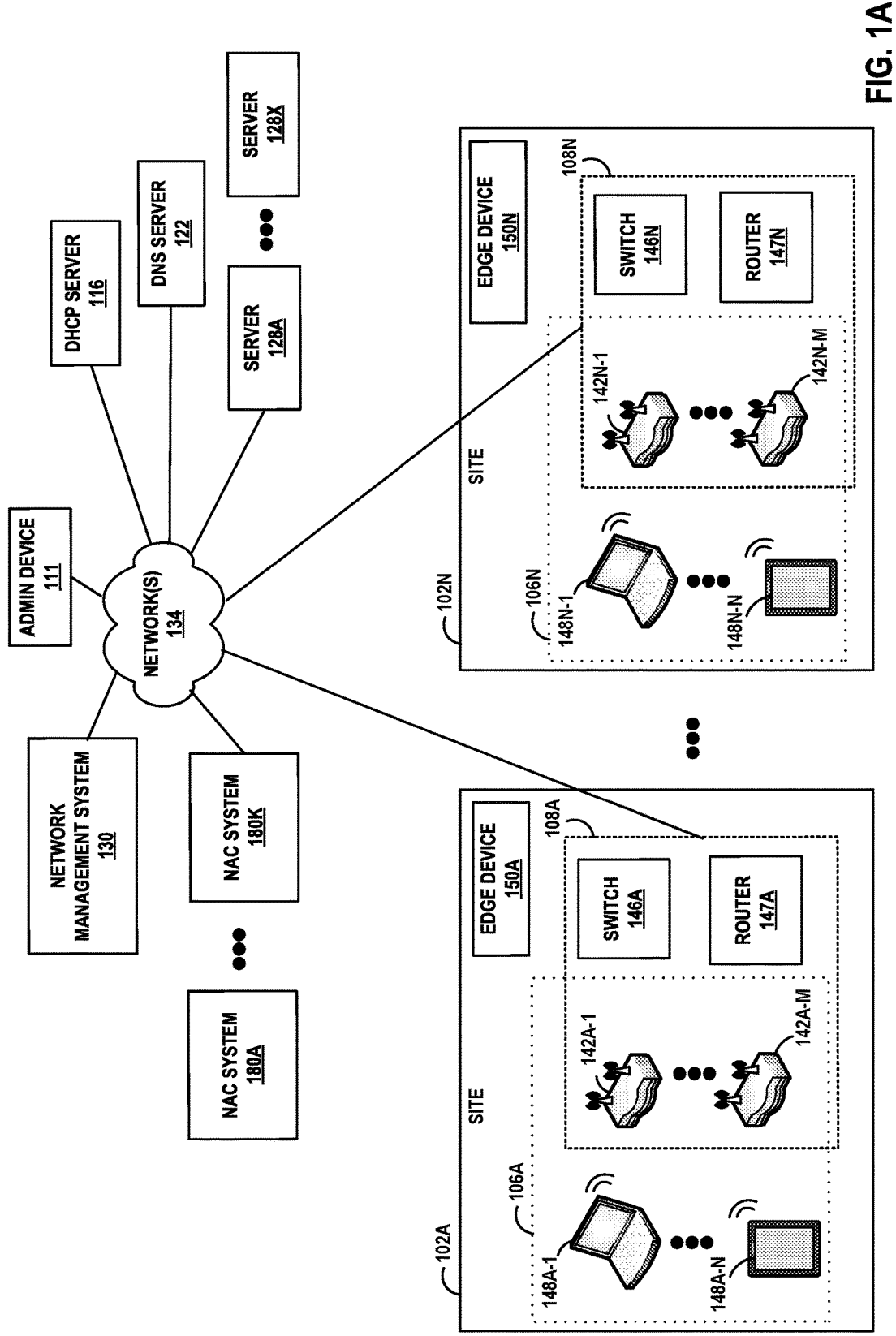
FIG. 1A is a block diagram of an example network system including a network management system and network access control systems, in accordance with one or more techniques of the disclosure.

FIG. 1A is a block diagram of an example network system 100 including network access control (NAC) systems 180A-180K and network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices 108A-108N, such as access points (APs) 142, switches 146, and routers 147. NAS devices may include any network infrastructure devices capable of authenticating and authorizing client devices to access an enterprise network. For example, site 102A includes a plurality of APs 142A-1 through 142A-M, a switch 146A, and a router 147A. Similarly, site 102N includes a plurality of APs 142N-1 through 142N-M, a switch 146N, and a router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1A as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, NAC systems 180 including or providing access to Authentication, Authorization and Accounting (AAA) servers for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., NAC systems 180, servers 116, 122 and/or 128, APs 142, switches 146, routers 147, UEs 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 116, 122 and/or 128, APs 142, switches 146, routers 147, and UEs 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

In the example of FIG. 1A, each of NAC systems 180 comprises a cloud-based network access control service at multiple, geographically distributed points of presence. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

In accordance with the disclosed techniques, NAC systems 180 provide multiple points of presence or NAC clouds at several geographic regions. NMS 130 is configured to manage NAC configuration, including access policies for enterprise networks, and push the appropriate NAC configuration data or files to the respective NAC clouds 180A-180K. In this way, NAC systems 180 provide the same benefits as a centralized, cloud-based network access control service with lower latency and high availability.

NAC systems 180 provide a way of authenticating client devices 148 to access wireless networks 106, such as branch or campus enterprise networks. NAC systems 180 may each include or provide access to an Authentication, Authorization, and Accounting (AAA) server, e.g., a RADIUS server, to authenticate client devices 148 prior to providing access to the enterprise network via the NAS devices 108. In some examples, NAC systems 180 may enable certificate-based authentication of client devices or enable interaction with cloud directory services to authenticate the client devices.

NAC systems 180 may identify client devices 148 and provide client devices 148 with the appropriate authorizations or access policies based on their identities, e.g., by assigning the client devices to certain virtual local area networks (VLANs), applying certain access control lists (ACLs), directing the client devices to certain registration portals, or the like. NAC systems 180 may identify client devices 148 by analyzing the network behavior of the client devices, referred to as fingerprinting. Identification of client devices may be performed based on media access control (MAC) addresses, DHCP options used to request IP addresses, link layer discovery protocol (LLDP) packets, user agent information, and/or device type and operating system information.

Client devices 148 may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network, NAC systems 180 may monitor activities of the client device to identify security concerns and, in response, re-assign the client device to a quarantine VLAN or another less privileged VLAN to restrict access of the client device.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities.

In some examples, AI-driven NMS 130 also provides configuration management, monitoring and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106, such as branch or campus enterprise networks, to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Although the techniques of the present disclosure are described in this example as performed by NAC systems 180 and/or NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NAC systems 180 or NMS 130, or may be distributed throughout network 100, and may or may not form a part of NAS systems 180 or NMS 130.

Figure 1B:
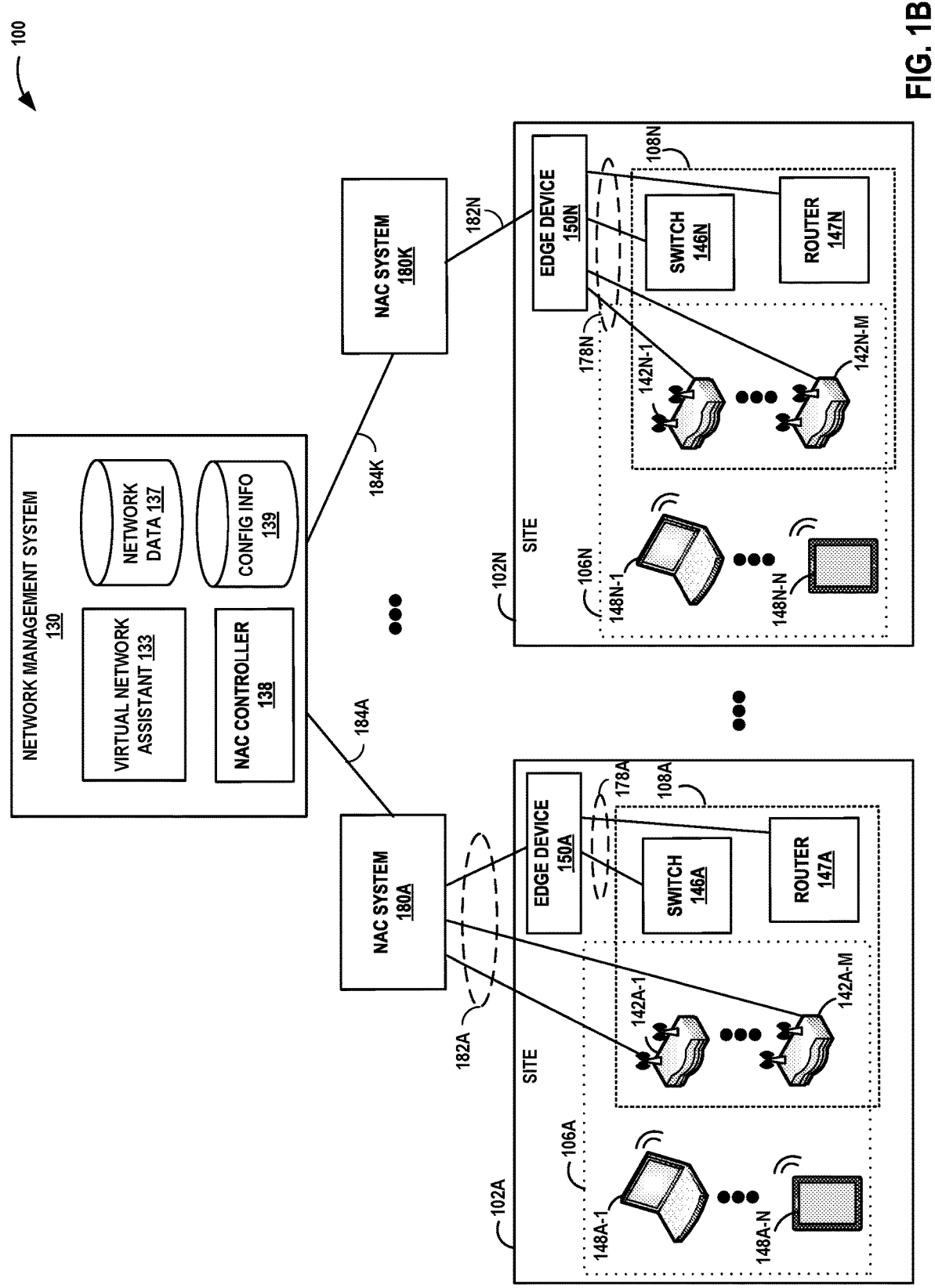
FIG. 1B is a block diagram illustrating further example details of the network system of FIG. 1A.

FIG. 1B is a block diagram illustrating further example details of the network system of FIG. 1A. In this example, FIG. 1B illustrates logical connections 178A-178N, 182A-182N, and 184A-184K, between NAS devices 108 at sites 102, NAC systems 180, and NMS 130. In addition, FIG. 1B illustrates NMS 130 configured to operate according to an AI-based computing platform to provide configuration and management of one or more of NAC systems 180 and NAS devices 108 at sites 102 via the logical connections.

In operation, NMS 130 observes, collects and/or receives network data 137, which may take the form of data extracted from messages, counters, and statistics, for example, from one or more of APs 142, switches 146, routers 147, edge devices 150, NAC systems 180, and/or other nodes within network 134. NMS 130 provides a management plane for network 100, including management of enterprise-specific configuration information 139 for one or more of NAS devices 108 at sites 102 and NAC systems 180. Each of the one or more NAS devices 108 and each of NAC systems 180 may have a secure connection with NMS 130, e.g., a RADSEC (RADIUS over Transport Layer Security (TLS)) tunnel or another encrypted tunnel. Each of the NAS devices 108 and NAC systems 180 may download the appropriate enterprise-specific configuration information 139 from NMS 130 and enforce the configuration. In some scenarios, one or more of the NAS devices 108 may be a third-party device or otherwise not support establishment of a secure connection directly with NMS 130. In these scenarios, edge devices 150 may provide proxies through which the NAS devices 108 may connect to NMS 130.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In some examples, NMS 130 monitors network data 137, e.g., one or more service level expectation (SLE) metrics, received from each site 102A-102N, and manages network resources, such as the one or more of APs 142, switches 146, routers 147, and edge devices 150 at each site, to deliver a high-quality wireless experience to end users, IoT devices and clients at the site. In other examples, NMS 130 monitors network data 137 received from NAC systems 180 and manages enterprise-specific configuration information 139 for NAC systems 180 to enable unconstrained network access control services for client devices 148 at sites 102 with low latency and high availability.

As illustrated in FIG. 1B, NMS 130 may include a virtual network assistant (VNA) 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, NAC systems 180, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In addition, as illustrated in FIG. 1B, NMS 130 may include a NAC controller 138 that implements a NAC configuration platform that provides a user interface to create and assign access policies for client devices 148 of enterprise networks 106, and provides the appropriate enterprise-specific configuration information 139 to the respective NAC clouds 180A-180K. NMS 130 may have a secure connection 184A-184K, e.g., a RADSEC tunnel or another encrypted tunnel, with each of NAC systems 180A-180K, respectively. Through secure connections 184, NAC controller 136 may receive network data 137, e.g., NAC event data, from each of NAC systems 180 and each of NAC systems 180 may download the appropriate configuration information 139 from NMS 130. In some examples, NAC controller 138 may log or map which enterprise networks are served by which of NAC systems 180. In addition, NAC controller 138 may monitor NAC systems 180 to identify failures of primary NAC systems and manage failovers to standby NAC systems.

NAC systems 180 provide network access control services in a control plane for one or more of NAS devices 108 at sites 102. In operation, NAC systems 180 authenticate client devices 148 to access enterprise wireless networks 106 and may perform fingerprinting to identify the client devices 148 and apply authorizations or access policies to the client devices 148 based on the identities. NAC systems 180 include multiple, geographically distributed points of presence. For example, NAC system 180A may comprise a first cloud-based system positioned within a first geographic region, e.g., U.S. East, NAC system 180B (not shown) may comprise a second cloud-based system positioned within a second geographic region, e.g., U.S. West, and NAC system 180K may comprise a $k^{th}$ cloud-based system positioned within a $k^{th}$ geographic region, e.g., Australia.

Deploying multiple NAC clouds at several geographic regions enables network access control services to be offered to nearby NAS devices with lower latency and high availability, while avoiding the processing limitations and maintenance issues experienced by on-premises NAC appliances. For example, NAS devices 108A within enterprise network site 102A may connect to the physically closest one of NAC systems, i.e., NAC system 180A, to experience lower latency for network access control services. In some examples, the physically closest one of NAC systems 180 may comprise a primary NAC system, and the NAS devices may also connect to a next closest one of NAC systems 180 as a standby NAC system in case of a failure of the primary NAC system. For example, NAS devices 108A within enterprise network site 102A may connect to both NAC system 180A and NAC system 108B (not shown), to experience high availability of network access control services.

In the example illustrated in FIG. 1B, each of the NAS devices 108, directly or indirectly, has a secure connection with at least one of NAC systems 180. For example, each of APs 142A within site 120A has a direct, secure connection 182A to NAC system 180A, e.g., a RADSEC tunnel or another encrypted tunnel. Each of switch 146A and router 147A within site 120A has an indirect connection to NAC system 180A via edge device 150A. In this example, switch 146A and router 147A may not support establishment of a secure connection directly with NAC system 180A, but edge device 150A may provide a proxy through which switch 146A and router 147A may connect to NAC system 180A. For example, each of switch 146A and router 147A have a direct connection 178A, e.g., a RADIUS tunnel, to edge device 150A, and edge device 150A has a direct, secure connection 182A to NAC system 180A. Similarly, for site 102N, each of NAS devices 108N has an indirect connection to NAC system 180K via edge device 150N. In this example, APs 142N, switch 142N, and router 147N may not support establishment of a secure connection directly with NAC system 180K, but edge device 150N may provide a proxy through which NAS devices 108N may connect to NAC system 180K. For example, each of APs 142N, switch 146N, and router 147N have a direct connection 178N, e.g., a RADIUS tunnel, to edge device 150N, and edge device 150N has a direct, secure connection 182N to NAC system 180K.

Through secure connections 182, NAC systems 180 may receive network access requests from client devices 148 through NAS devices 108 (and in some cases edge devices 150) at nearby enterprise sites 102. In response to the network access requests, NAC systems 180 authenticate the requesting client devices using an AAA server. NAC system 180 may perform fingerprinting to identify the authenticated client devices. NAC systems 180 then enforce the appropriate access policies on the identities of the authenticated client devices per the enterprise-specific configuration information 139 downloaded from NMS 130. In accordance with one specific implementation, a computing device is part of each of NAC systems 180. In accordance with other implementations, each of NAC systems 180A-180K may comprise one or more computing devices, dedicated servers, virtual machines, containers, services, or other forms of environments for performing the techniques described herein.

In accordance with one or more techniques of this disclosure, the NAC systems 180 may allow for identification and validation of a tenant or organization to which NAS devices 108 belong. The NAC systems 180 may be multi-tenant systems, with each NAC system serving multiple organizations or tenants. In order to provide the appropriate NAC services associated with a certain organization or tenant, NAC systems 180 need to be able to identify the organization or tenant to which a particular NAS device 108 belongs.

The NAC systems 180 may receive an indicator from the NAS device 108 that allows the NAC systems 180 to identify the organization or tenant that the NAS device 108 is associated with. The NAC systems 180 may map the identifier to the specific configuration information for the organization or tenant.

The Transport Layer Security (TLS)/Secure Sockets Layer (SSL) extension Server Name Indication (SNI) can be used as the identifier to identify the organization that the NAS device is associated. The identifier, such as an SNI value, may be sent in a 'client hello' message from the NAS device to the NAC system. This extends the functionality of the Server Name Indication (SNI), which is typically used to identify a specific desired web server in a web server hosting multiple websites.

The 'client hello' is part of a TLS handshake done at the start of a communication session that uses TLS encryption. During a TLS handshake, the two communicating sides exchange messages to acknowledge each other, verify each other, establish the encryption algorithms they will use, and agree on session keys.

In a cloud-based architecture in which NMS 130 provides the management plane and one or more NAC systems 180 provide configuration enforcement, NAS devices 108 may open RADSEC (Radius over TLS)-based tunnels directly to the NAC systems 180 for NAC service, e.g., tunnels 182. Accurate identification of the tenant or organization of the NAS devices 108 by a NAC system 180 enables the use of the correct organization server certificate during the TLS handshake and/or retrieval of the correct organization configuration information from the NMS 130 to the NAC cloud when needed.

RADSEC does not include any NAS device information and does not allow custom payloads or data. However, RADSEC TLS client hello requests allow the use of an SNI field extension.

The disclosed technique may use the SNI field to carry the identity of the tenant or organization. The NAC systems 180 may map the SNI of the organization to configuration information for the organization. In response to receipt of a 'client hello' message from one of NAS devices 108, NAC system 180A, for example, may use the SNI value to look locally for an appropriate server certificate for the organization identified by the SNI value. If an appropriate server certificate is stored locally, NAC system 180A may provide the server certificate to the NAS device in a 'server hello' message, and the TLS handshake may continue.

If NAC system 180A does not have the appropriate server certificate, the NAC system 180A may request configuration information for the organization from the NMS 130. The NMS 130 may check whether it is appropriate to download the configuration information to the NAC system 180A based on policies. For example, the NMS 130 may restrict the download of configuration information based on the physical location of NAC system 180A. In this way, organizations may restrict the storage of the configuration information in specific countries.

Figure 1C:
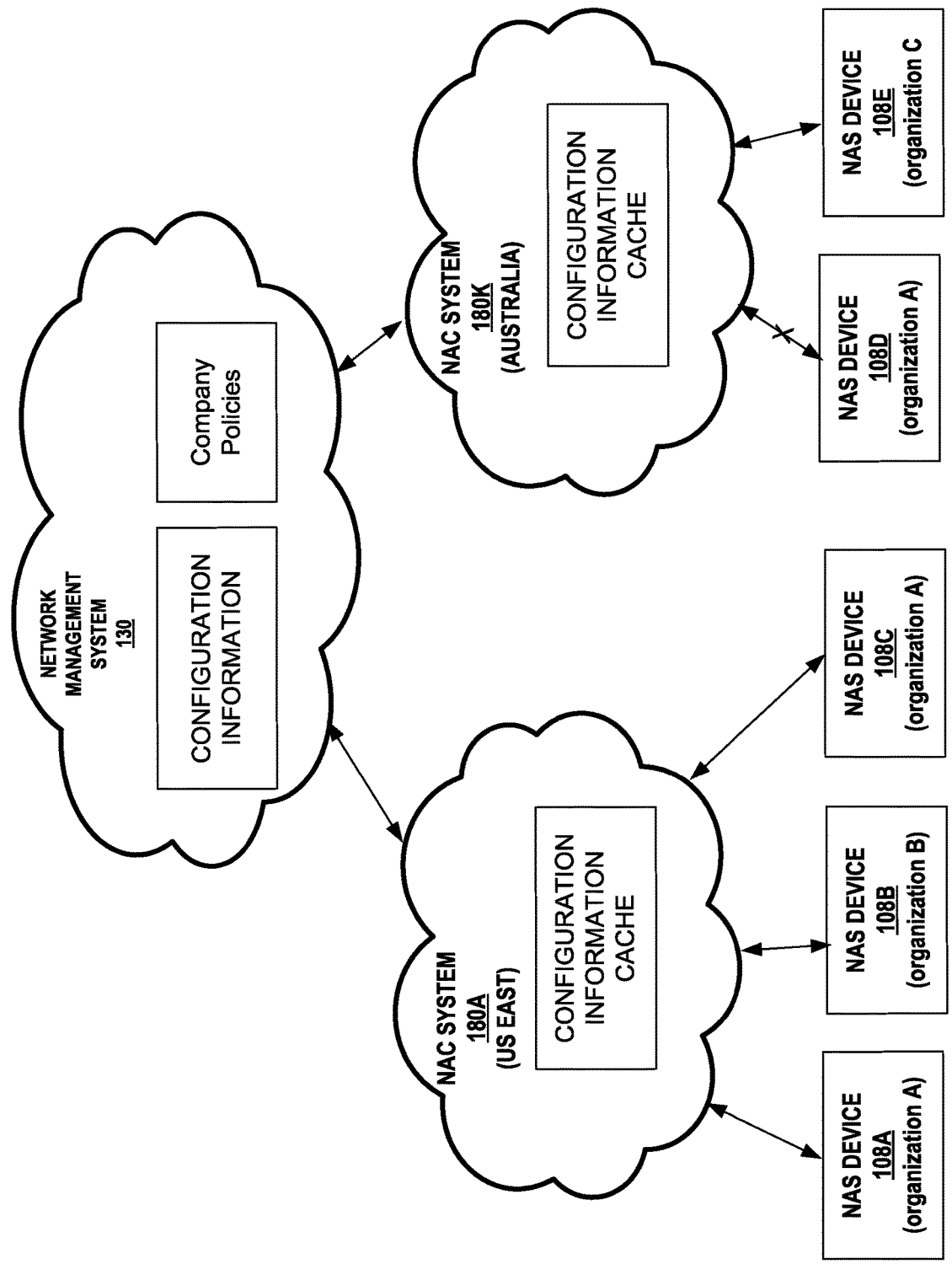
FIG. 1C is a conceptual diagram illustrating further example details of the network system of FIG. 1A.

FIG. 1C is a conceptual diagram illustrating further example details of the network system of FIG. 1A. In this example, NAS devices 108A, 108C, and 108D are associated with organization A. NAS device 108B is associated with organization B. NAS device 108E is associated with organization C. NAC system 180A is physically located in US East, and NAC system 180K is physically located in Australia.

Assuming NAS device 108D attempts to gain access to the enterprise network of organization A through NAC system 180K, which is physically located in Australia, and the configuration information for organization A is not stored locally at NAC system 180K, the NAC system 180K will attempt to download or otherwise retrieve the configuration information for organization A from the NMS 130.

The NMS 130 may check the company policies of organization A to determine whether it should supply configuration information to NAC system 180K physically located in Australia. In this example, the policy does not allow the configuration for organization A to be stored at NAC system 180K physically located in Australia, so the request is denied, and NAC system 180K is prevented from establishing a secure connection with NAS device 108D.

By contrast, assuming NAS device 108A attempts to gain access to the enterprise network of organization A through NAC system 180A, which is physically located in US EAST, and the configuration information for organization A is not stored locally at NAC system 180A, the NAC system 180A will attempt to download or otherwise retrieve the configuration information for organization A from the NMS 130.

The NMS 130 may check the company policies of organization A to determine whether it should supply configuration information to NAC system 180A physically located in US EAST. In this example, the policy does allow the configuration for organization A to be stored at NAC system 180A physically located in US EAST, so the request is allowed, and the configuration information is provided to NAC system 180A to allow it to establish a secure connection with the NAS device 108A.

The configuration information for organization A may remain in the configuration information cache of NAC system 180A, so when NAS device 108C later attempts to connect to NAC system 180A, the configuration information for organization A will be stored locally at NAC system 180A and will not need to be reobtained from NMS 130. In this way, the configuration information for a particular organization or tenant may be distributed from the NMS 130 to the particular ones of NAC systems 180 that receive access requests from NAS devices that belong to the particular organization or tenant, referred to as "lazy downloads." In this way, all of the configuration information for every organization does not need to be sent to and stored at every one of NAC systems 180. NAC systems 180 may clear the configuration information for network tenants from the local cache if the configuration information is not used in a predetermined time period. For example, the configuration information for a particular tenant may be cleared from the configuration information cache if the configuration information for that particular tenant has not been used to authenticate a client device in the last 10-15 days in order to keep the configuration information current.

NMS 130 may provide configuration information updates to the NAC systems 180. The NAC systems 180 may update their respective configuration information caches using the configuration information updates. The configuration information updates may be for organizations whose information is stored in the respective configuration information caches of NAC systems 180. The configuration information updates may indicate the current configuration for an organization. The NMS 130 may periodically send configuration updates, such as once a day. The NMS 130 may track what configuration information has previously been sent to each NAC system 180 to determine which of the NAC systems 180 to send the configuration information updates.

Once the NAC system 180A obtains the correct server certificate for the organization, the NAC system 180A may provide the server certificate to the NAS device 108 in a 'server hello' message, and the TLS handshake continues. When the TLS handshake continues, the NAC system 180A may request that the NAS device provide a "client certificate." This "client certificate" may be checked by the NAC system 180 using a Certificate Authority (CA). The correct certificate authority to be checked may depend on the organization identified by the SNI. The CA may be a private CA that is specific to an organization. In a private CA, certificates are signed with the private key of the organization's root certificate. The private CA may issue certificates for an organization's internal network. However, the location of a private CA may need to be determined or looked up rather than with public CAs whose addresses are typically well known.

The NAC system 180A may use the indicator in the SNI field to determine the CA for the organization by obtaining the configuration information corresponding to the SNI. The CA may be managed and located at the NMS 130 or another location. If the "client certificate" passes the certificate check at the CA, the NAC system 180A may proceed to set up the secure tunnel between the NAC system 180A and the NAS device 108. If the "client certificate" fails the certificate check at the CA, the NAC system 180A may block access to the NAS device 108.

The NMS 130 may provision the NAS device 108 with the indicator to insert in the SNI field and the "client certificate" for the NAS device 108. Alternately, NAS devices 180 may be independently provisioned with the SNI field and the "client certificate."

The techniques of this disclosure provide one or more technical advantages and practical applications. For example, the techniques allow for identifying an organization associated with a NAS device when using standard TLS-based protocols, which provide no ability to add custom interactions and/or payloads. This technique is an extension of the TLS handshake and may be used in various TLS-based protocols. In addition, the techniques of this disclosure allow for the NAC systems to not store all of the configuration information for every organization and for configuration information to be restricted from certain NAC system locations as a result of the policy.

Figure 2:
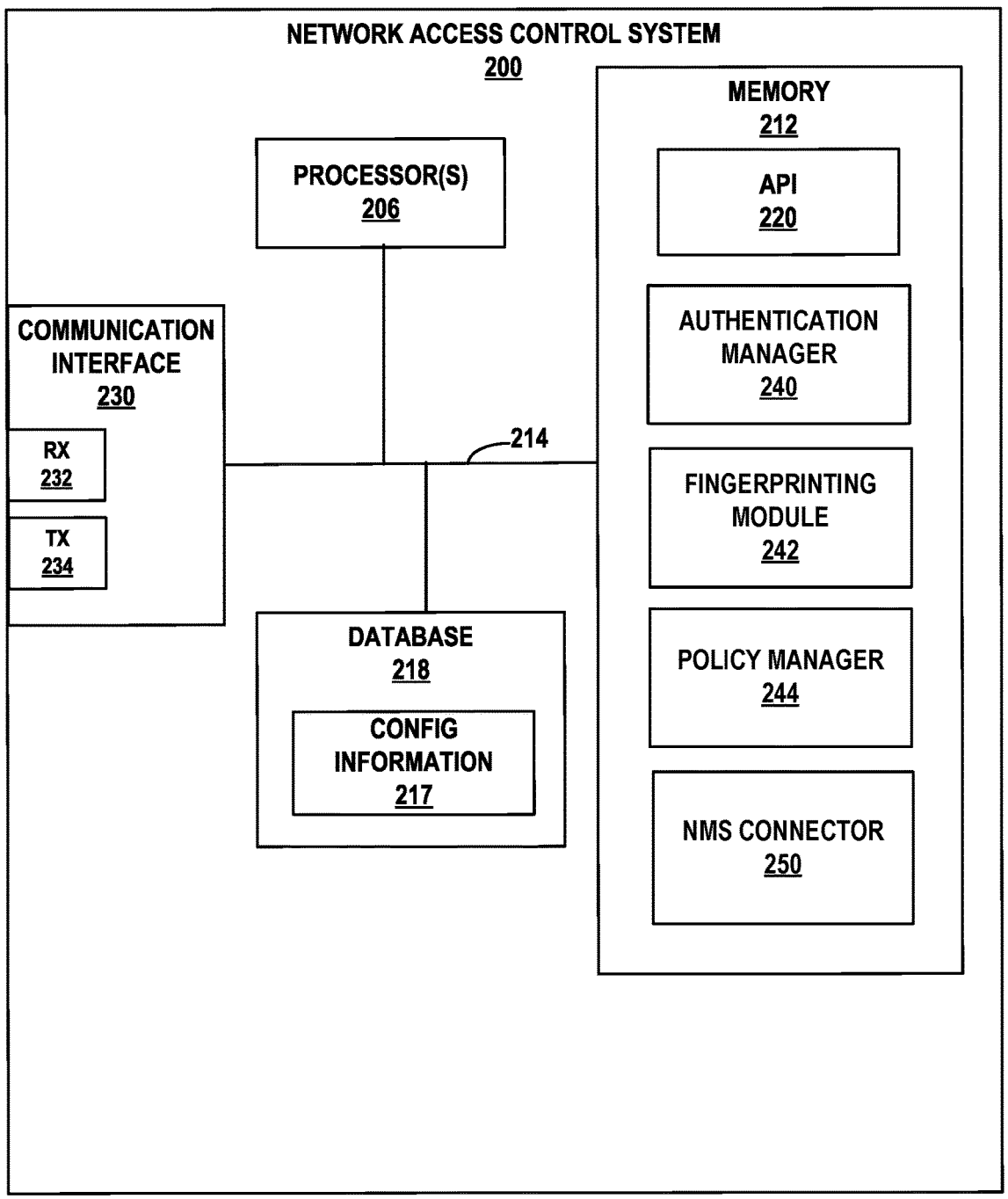
FIG. 2 is a block diagram of an example network access control system, in accordance with one or more techniques of this disclosure.

FIG. 2 is a block diagram of an example network access control (NAC) system 200, in accordance with one or more techniques of the disclosure. NAC system 200 may be used to implement, for example, any of NAC systems 180 in FIGS. 1A, 1B, and 1C. In such examples, NAC system 200 is responsible for authenticating and authorizing one or more client devices 148 to access enterprise wireless networks 106 at a sub-set of nearby enterprise sites 102A-102N.

NAC system 200 includes a communications interface 230, one or more processor(s) 206, a user interface 210, a memory 212, and a database 218. The various elements are coupled together via a bus 214 over which the various elements may exchange data and information. In some examples, NAC system 200 receives network access requests from one or more of client devices 148 through NAS devices 108 (and in some cases edge devices 150) at the sub-set of nearby enterprise sites 102 from FIGS. 1A, 1B. NAC system 200 authenticates the requesting client devices in response to the network access requests. In some examples, NAC system 200 enforces appropriate access policies on the authenticated client devices in accordance with enterprise-specific configuration information 217 downloaded from NMS 130 from FIGS. 1A, 1B. In some examples, NAC system 200 may be part of another server shown in FIGS. 1A, 1B or a part of any other server.

Processor(s) 206 execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 230 may include, for example, an Ethernet interface. Communications interface 230 couples NAC system 200 to a network and/or the Internet, such as any of network 134 as shown in FIG. 1A and/or any local area networks. Communications interface 230 includes a receiver 232 and a transmitter 234 by which NAC system 200 receives/transmits data and information to/from any of APs 142, switches 146, routers 147, edge devices 150, NMS 130, or servers 116, 122, 128 and/or any other network nodes, devices, or systems forming part of network system 100 such as shown in FIGS. 1A, 1B.

The data and information received by NAC system 200 may include, for example, configuration information 217 associated with one or more of enterprise sites 102 that is downloaded from NMS 130. Configuration information 217 may include enterprise-specific NAC configuration information, including access policies and associated policy assignment criteria. For example, configuration information 217 may define certain virtual local area networks (VLANs), access control lists (ACLs), registration portals, or the like, associated with certain categories of client devices. Configuration information 217 may further define, for each of the different categories of the client devices, different types of tracking, different types of authorization, and/or different levels of access privileges. In addition, the data and information received by NAC system 200 may include identification information of client devices 148 from NAS devices 108 that is used by NAC system 200 to perform fingerprinting of the end user devices in order to enforce the access policies as defined in configuration information 217. NAC system 200 may further transmit data and information via communications interface 330 to NMS 130 including, for example, NAC event data, which may be used by NMS 130 to remotely monitor the performance of NAC system 200.

Memory 212 includes one or more devices configured to store programming modules and/or data associated with operation of NAC system 200. For example, memory 212 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes an API 220, an authentication manager 240, a fingerprinting module 240, a policy manager 244, and an NMS connector 250. NAC system 200 may also include any other programmed modules, software engines and/or interfaces configured for authentication and authorization of client devices 148.

Authentication manager 240 enables authentication of client devices 148 at NAS devices 108 to access wireless networks 106, such as branch or campus enterprise networks, at the sub-set of enterprise sites 102 in communication with NAC system 200. Authentication manager 240 may perform the functionality of an AAA server, e.g., a RADIUS server, or provide access to an AAA server to authenticate client devices 148 prior to providing access to the enterprise networks 106 via the NAS devices 108. In some examples, authentication manager 240 may participate in a handshake exchange between a client device, an NAS device, and NAC system 200 controlling access at the NAS device. In other examples, authentication manager 240 may enable certificate-based authentication of client devices or enable interaction with cloud directory services to authenticate the client devices.

Fingerprinting module 242 enables identification of client devices 148 used to provide the client devices with appropriate authorizations or access policies based on their identities or categorizations. Fingerprinting module 242 may identify client devices 148 by analyzing network behavior of the client devices. Fingerprinting module 242 may receive the network behavior data of the client devices from the NAS devices 108 and/or edge devices 150 in communication with NAC system 200. For example, fingerprinting module 242 may perform fingerprinting of client devices 148 based on one or more of MAC addresses, DHCP options used to request IP addresses, LLDP packets, user agent information, and/or device type and operating system information.

Policy manager 244 enables enforcement of the authorizations or access policies based on the identities or categorizations of the authenticated client devices. For example, policy manager 244 may assign the authenticated client devices to certain VLANs, apply certain ACLs, direct the client devices to certain registration portals, or the like, that are each associated with different types of tracking, different types of authorization, and/or different levels of access privileges in accordance with configuration information 217 for the corresponding enterprise of the client devices. In some examples, after a client device gains access to the enterprise network, policy manger 244 may monitor activities of the client device to identify security concerns and, in response, re-assign the client device to a quarantine VLAN or another less privileged VLAN to restrict access of the client device.

NMS connector 250 manages the data and information exchanged between NAC system 200 and NMS 130, e.g., via a RADSEC tunnel or another encrypted tunnel 182, as shown in FIG. 1B. NMS connector 250 may maintain a log or mapping of which enterprise networks are served by NAC system 200 and the corresponding configuration information 217 for those enterprises. NMS connector 250 may also manage any updates or modifications to configuration information 217 received from NMS 130.

In accordance with one or more techniques of this disclosure, authentication manager 240 of NAC system 200 may set up a RADSEC tunnel or another encrypted tunnel 182, as shown in FIG. 1B with one or more NAS devices 108 associated with one or more tenants or organizations. Authentication manager 240 may determine the organization to which a NAS device belongs from an identifier, such as the SNI field of the "Client Hello" message, included in a request to establish a secure tunnel from the NAS device. Authentication manager 240 may provide an appropriate server certificate, as indicated by the identifier, to the NAS device 108, such as in a 'server hello' message. Authentication manager 240 may request a client certificate from the NAS device 108 and check this client certificate for the organization that the NAS device 108 is associated with as indicated by the indicator, such as the SNI. Authentication manager 240 may check configuration information 217 to find configuration information for the organization that the NAS device 108 is associated with as indicated by the indicator, such as the SNI. The organization-based configuration information may include the server certificate and an indication of a CA to check the client certificate provided by the NAS device 108. The authentication manager 240 may include a configuration information cache logic to store and use organization-based configuration information using configuration information 217

Figure 3:
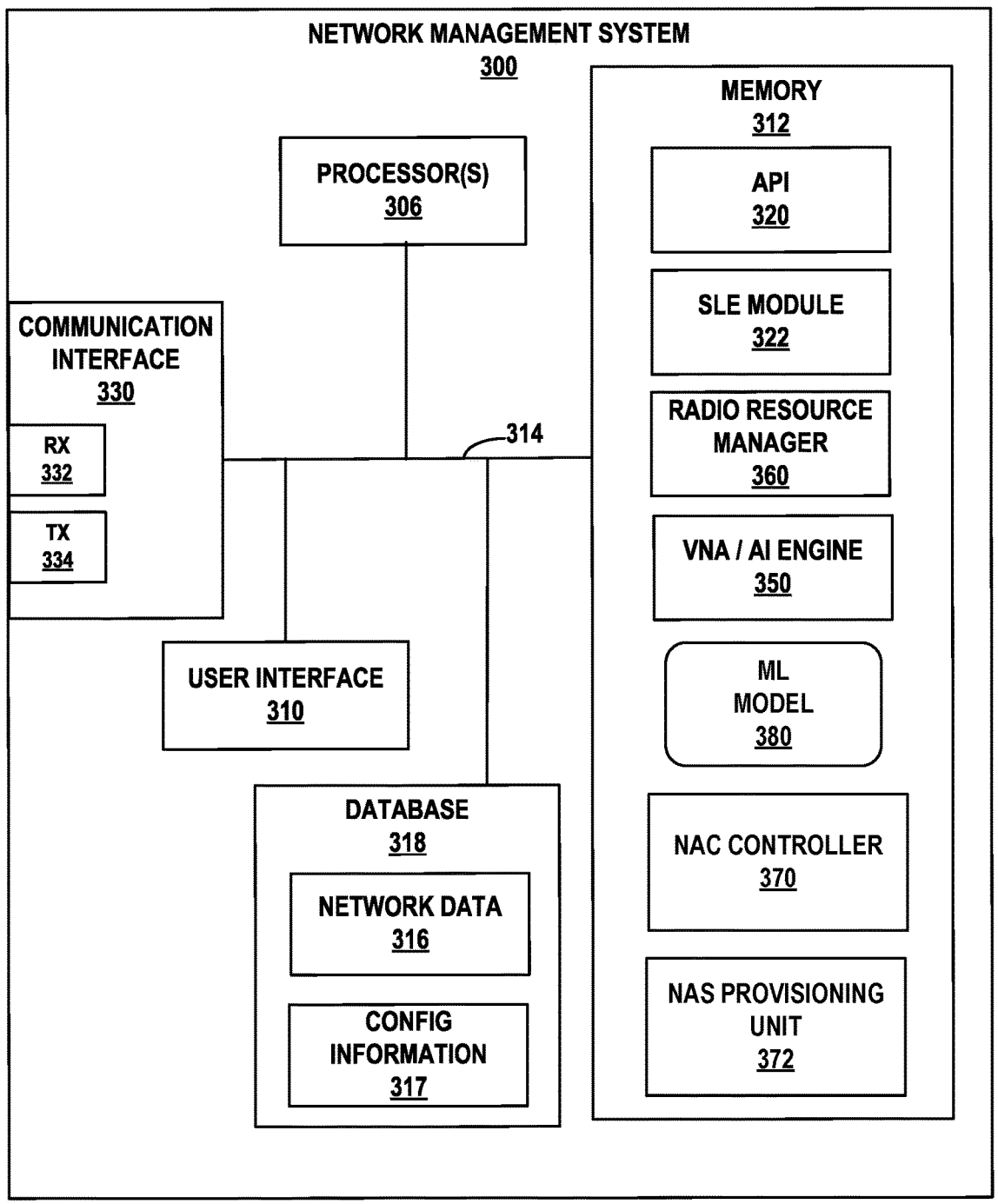
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A, 1B, and 1C. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146, routers, 147, edge devices 150, NAC systems 180, and other network nodes within network 134, e.g., routers and gateway devices, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, routers 147, edge devices 150, NAC systems 180, servers 116, 122, 128 and/or any other network nodes, devices, or systems forming part of network system 100 such as shown in FIG. 1A. In some scenarios described herein in which network system 100 includes "third-party" network devices that are owned and/or or associated with different entities than NMS 300, NMS 300 does not directly receive, collect, or otherwise have access to network data from the third-party network devices. In some examples, an edge device, such as edge devices 150 from FIGS. 1A, 1B may provide a proxy through which the network data of the third-party network devices may be reported to NMS 300.

The data and information received by NMS 300 may include, for example, telemetry data, SLE-related data, or event data received from one or more of client device APs 148, APs 142, switches 146, routers 147, edge devices 150, NAC systems 180, or other network nodes, e.g., routers and gateway devices, used by NMS 300 to remotely monitor the performance of wireless networks 106A-106N and application sessions from client device to cloud-based application server. NMS 300 may further transmit data via communications interface 330 to any of the network devices, such as client devices 148, APs 142, switches 146, routers 147, edge devices 150, NAC systems 180, or other network nodes within network 134, to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, and a NAC controller 370. NMS 300 may also include any other programmed modules, software engines and/or interfaces configured for remote monitoring and management of wireless networks 106A-106N and portions of the wired network, including remote monitoring and management of any of APs 142, switches 146, routers 147, edge devices 150, NAC systems 180, or other network devices, e.g., routers and gateway devices.

SLE module 322 enables set up and tracking of thresholds for SLE metrics for each network 106A-106N. SLE module 322 further analyzes SLE-related data collected by, e.g., APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. In some examples, ML model 380 may comprise a supervised ML model that is trained, using training data comprising pre-collected, labeled network data received from the network devices. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

NAC controller 370 implements a NAC configuration platform that provides user interface 310 for display to an enterprise network administrator, e.g., via admin device 111 of FIG. 1A, through which to receive access policy information for the enterprise network. NAC controller 370 creates enterprise-specific configuration information 317 stored in database 318 based on the input received via user interface 310. Configuration information 317 may include NAC configuration information for one or more enterprise networks managed by NMS 300. For each enterprise, configuration information 317 may include access policies and associated policy assignment criteria. For example, configuration information 317 may define certain VLANs, ACLs, registration portals, or the like, associated with certain categories of client devices, and may further define, for each of the different categories of the client devices, different types of tracking, different types of authorization, and/or different levels of access privileges. Configuration information 317 may be substantially similar to configuration information 139 of FIG. 1B.

NAC controller 370 manages the data and information exchanged between NMS 300 and NAC systems 180, e.g., via a RADSEC tunnels or another encrypted tunnels 184, as shown in FIG. 1B. NAC controller 370 may maintain a log or mapping of which enterprise networks are served by which of NAC systems 180 and the corresponding configuration information 317 for those enterprises. NAC controller 370 may also manage any updates or modifications to configuration information 317 to be pushed down to NAC systems 180. In addition, NAC controller 370 may monitor NAC systems 180 to identify failures of primary NAC systems and manage failovers to standby NAC systems.

In accordance with one or more techniques of this disclosure, NAC controller 370 may provide organization-based configuration information to a NAC system, such as one of NAC systems 180 from FIGS. 1A-1C or NAC system 200 from FIG. 2, to allow the NAC system to set up secure tunnels, e.g., RADSEC or other encrypted tunnel, with one or more NAS devices. The organization-based configuration information may include server certificates for the NAC system and indications of an organization CA. NAC controller 370 may provide periodic configuration updates to the NAC system. NAC controller 370 may use policies to determine whether to provide the organization-based configuration information to the NAC system. Configuration information 317 may include the organization-based configuration information and policies.

NAS provisioning unit 272 may provision the NAS devices, such as NAS devices 108 from FIGS. 1A-1C, with the indicator to insert in the SNI field and the "client certificate" for the NAS device.

Although the techniques of the present disclosure are described in this example as performed by NMS 130, techniques described herein may be performed by any other computing device(s), system(s), and/or server(s), and the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
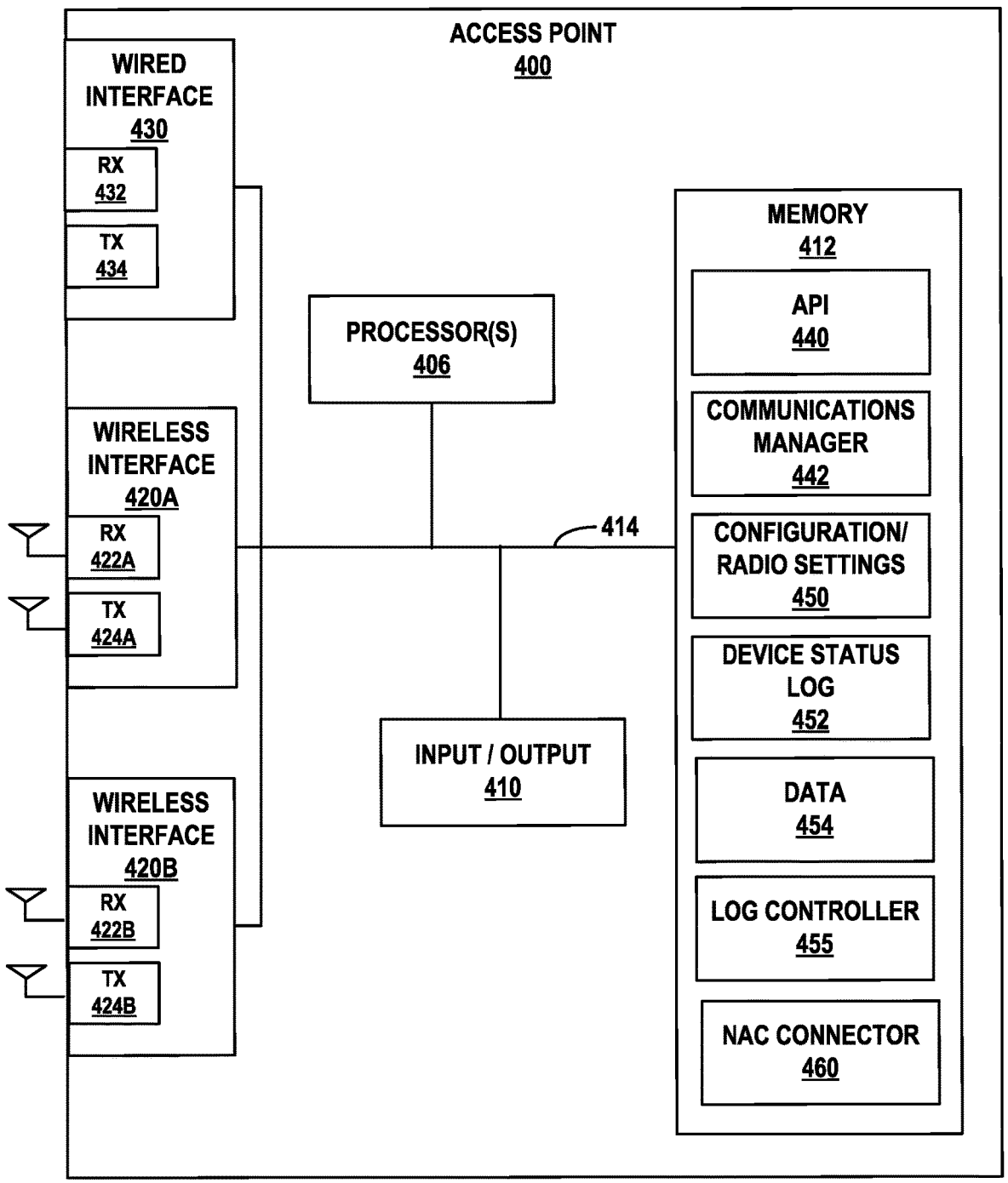
FIG. 4 is a block diagram of an example access point device, in accordance with one or more techniques of this disclosure.

FIG. 4 is a block diagram of an example access point (AP) device 400, in accordance with one or more techniques of this disclosure. Example access point 400 shown in FIG. 4 may be used to implement any of APs 142 as shown and described herein with respect to FIG. 1A. Access point 400 may comprise, for example, a Wi-Fi, Bluetooth and/or Bluetooth Low Energy (BLE) base station or any other type of wireless access point.

In the example of FIG. 4, access point 400 includes a wired interface 430, wireless interfaces 420A-420B one or more processor(s) 406, memory 412, and input/output 410, coupled together via a bus 414 over which the various elements may exchange data and information. Wired interface 430 represents a physical network interface and includes a receiver 432 and a transmitter 434 for sending and receiving network communications, e.g., packets. Wired interface 430 couples, either directly or indirectly, access point 400 to a wired network device, such as one of switches 146 or routers 147 of FIGS. 1A, 1B, within the wired network via a cable, such as an Ethernet cable.

First and second wireless interfaces 420A and 420B represent wireless network interfaces and include receivers 422A and 422B, respectively, each including a receive antenna via which access point 400 may receive wireless signals from wireless communications devices, such as UEs 148 of FIGS. 1A, 1B. First and second wireless interfaces 420A and 420B further include transmitters 424A and 424B, respectively, each including transmit antennas via which access point 400 may transmit wireless signals to wireless communications devices, such as UEs 148 of FIGS. 1A, 1B. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy (BLE) interface.

As described above, AP 400 may request network access for one or more UEs 148 from a nearby NAC system, e.g., NAC system 200 of FIG. 2 or one of NAC systems 180 of FIGS. 1A, 1B.

Processor(s) 406 are programmable hardware-based processors configured to execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of access point 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 stores executable software including an application programming interface (API) 440, a communications manager 442, configuration settings 450, a device status log 452, data storage 454, and log controller 455. Device status log 452 includes a list of events specific to access point 400. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 455 determines a logging level for the device based on instructions from NMS 130. Data 454 may store any data used and/or generated by access point 400, including data collected from UEs 148, such as data used to calculate one or more SLE metrics, that is transmitted by access point 400 for cloud-based management of wireless networks 106A by NMS 130/300.

Input/output (I/O) 410 represents physical hardware components that enable interaction with a user, such as buttons, a display, and the like. Although not shown, memory 412 typically stores executable software for controlling a user interface with respect to input received via I/O 410. Communications manager 442 includes program code that, when executed by processor(s) 406, allow access point 400 to communicate with UEs 148 and/or network(s) 134 via any of interface(s) 430 and/or 420A-420C. Configuration settings 450 include any device settings for access point 400 such as radio settings for each of wireless interface(s) 420A-420C. These settings may be configured manually or may be remotely monitored and managed by NMS 130 to optimize wireless network performance on a periodic (e.g., hourly or daily) basis.

As described herein, AP device 400 may measure and report network data from status log 452 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130/300 may determine one or more SLE metrics based on the SLE-related data received from the APs in the wireless network and store the SLE metrics as network data 137 (FIG. 1B).

In accordance with one or more techniques of this disclosure, NAC connector 460 may be used to request and, if authenticated, set up a secure tunnel, e.g., a RADSEC tunnel or another encrypted tunnel, to at least one NAC system, such as one of NAC systems 180 of FIGS. 1A-1C or NAC system 200 of FIG. 2. NAC connector 460 may send an identifier, such as an SNI value in a 'client hello' message, that indicates the organization of the access point 400 from the access point 400 to the NAC system, NAC connector 460 may also evaluate a server certificate received back from the NAC system and send a client certificate to the NAC system to complete an authentication handshake, e.g., a TLS handshake.

Figure 5:
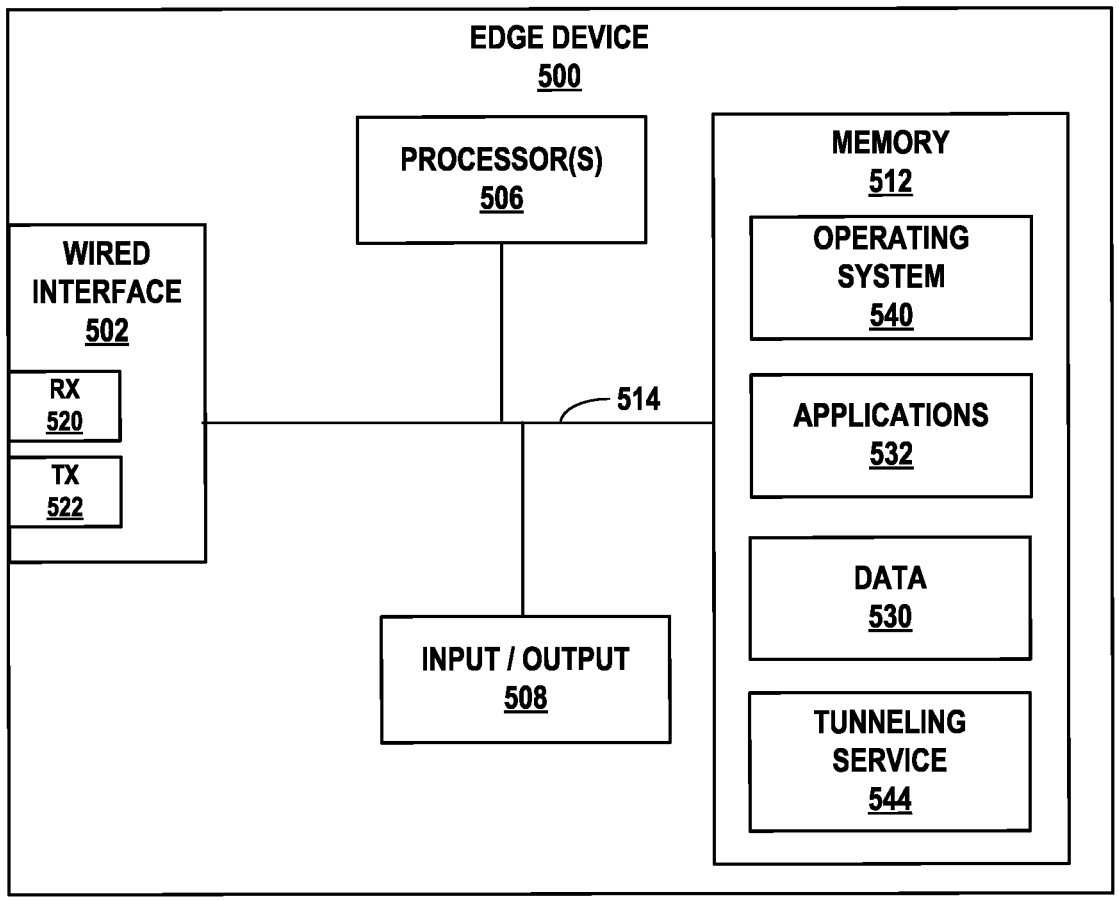
FIG. 5 is a block diagram of an example edge device, in accordance with one or more techniques of this disclosure.

FIG. 5 is a block diagram illustrating an example edge device 500, in accordance with one or more techniques of this disclosure. Edge device 500 comprises a cloud-managed, wireless local area network (LAN) controller. Edge device 500 may implement, for example, any of edge devices 150 in FIGS. 1A, 1B. In such examples, edge device 500 comprises an on-premises device at a site 102 that is in communication with NMS 130 and one or more on-premises NAS devices 108, e.g., one or more APs 142, switches 146, or routers 147, from FIGS. 1A, 1B. Edge device 500 with NMS 130 and may operate to extend certain microservices from NMS 130 to the on-premises NAS devices 108 while using NMS 130 and its distributed software architecture for scalable and resilient operations, management, troubleshooting, and analytics.

In this example, edge device 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples edge device 500 to a network, such as network 134 shown in FIG. 1A and/or any local area networks. Wired interface 502 includes a receiver 520 and a transmitter 522 by which edge device 500 receives/transmits data and information to/from any of NAS devices 108 and NMS 130 and/or NAC systems 180. Though only one interface is shown by way of example, edge device 500 may have multiple communication interfaces and/or multiple communication interface ports.

Memory 512 stores executable software applications 532, operating system 540, and data/information 530. Data 530 may include a system log and/or an error log that stores event data, including behavior data, for edge device 500. Tunneling service 544 provides on-premises tunnel termination from APs and other NAS devices. Tunneling service 544 further provides a secure tunnel proxy to NMS 130 and/or NAC systems 180. In one scenario, one or more of the NAS devices 108, e.g., switch 146A from FIG. 1B, may not support the establishment of RADSEC tunnels directly with NMS 130 and/or NAC systems 180. In this scenario, tunneling service 544 of edge device 500 provides a RADSEC proxy to enable RADIUS packets received from switch 146A via a RADIUS tunnel 178A to be tunneled to NAC system 180A using a RADSEC tunnel 182A, as shown in FIG. 1B.

In accordance with one or more techniques of this disclosure, tunneling service 544 may be used to set up the secure tunnel, e.g., a RADSEC tunnel or another encrypted tunnel, to the NAC system, such as one of NAC systems 180 of FIGS. 1A-1C or NAC system 200 of FIG. 2. Tunneling service 544 may send an identifier, such as an SNI value in a 'client hello' message, that indicates the organization of the edge device 500 from the edge device 500 to the NAC system. Tunneling service 544 may also evaluate a server certificate received back from the NAC system and send a client certificate to the NAC system to complete an authentication handshake, e.g., a TLS handshake.

Figure 6:
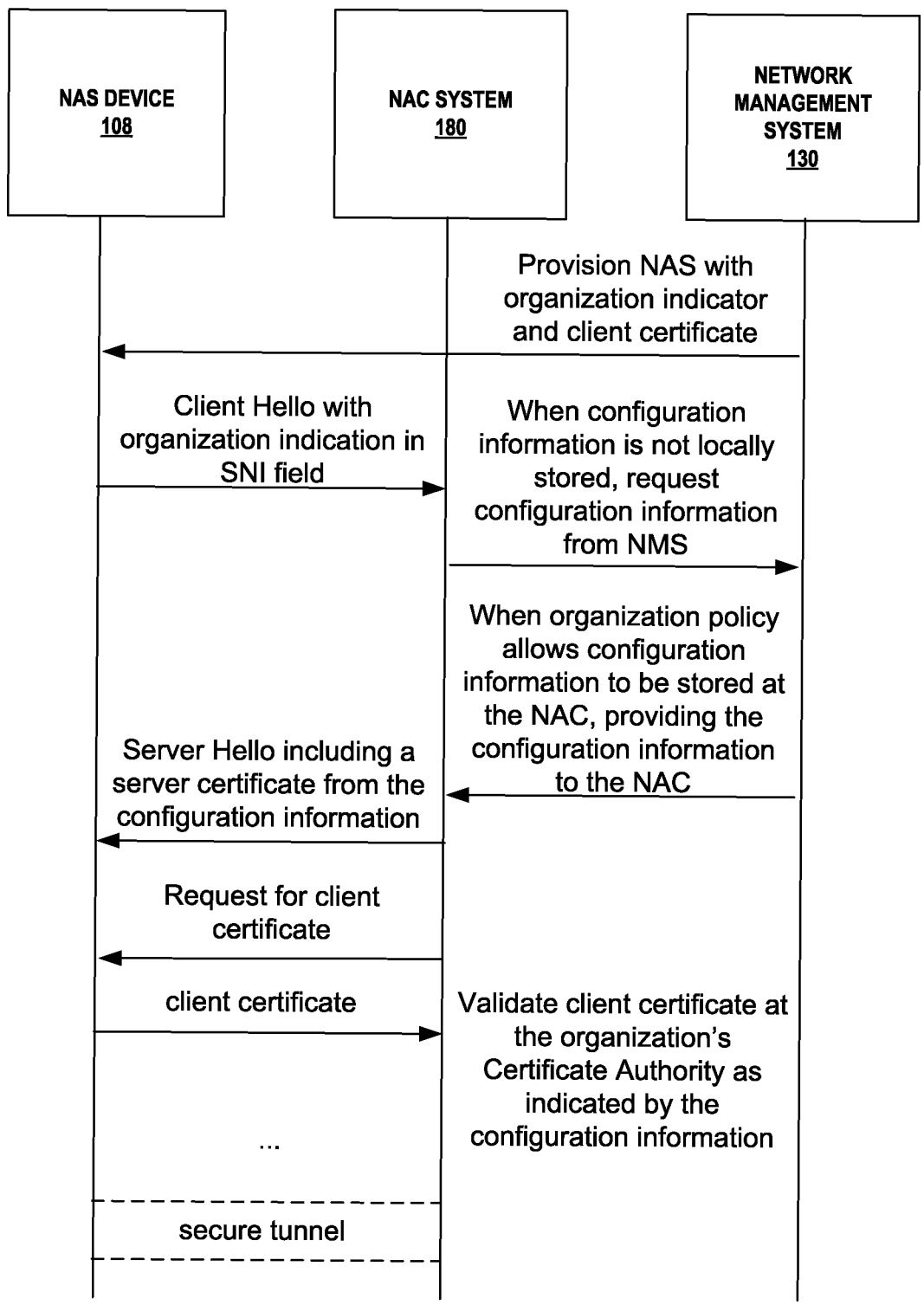
FIG. 6 is a conceptual diagram illustrating an example communication flow.

FIG. 6 is a conceptual diagram illustrating an example communication flow. The communication flow of FIG. 6 is described with respect to NAS device 108, NAC system 180, and NMS 130 from FIGS. 1A-1C. NMS 130 provisions NAS device 108 with an organization indicator and client certificate. When the NAS device 108 attempts to set up a tunnel, the NAS device 108 may send a Client Hello with an organization indicator in the SNI field to NAC system 180. The NAC system 180 may map the indicator to organization-specific configuration information. When configuration information for the organization is locally stored at the NAC system 180, the NAC system 180 may send a Server Hello, including a server certificate from the configuration information.

When configuration information for the organization is not locally stored at the NAC system 180, NAC system 180 requests the configuration information from NMS 130 using the SNI. The NMS 130 may map the indicator to organization-specific configuration information. The NMS 130 may check an organization policy for the organization identified by the SNI to see whether NAC system 180 is allowed to store the configuration information, e.g., based on a physical geo-location of NAC system 180. When organization policy allows configuration information to be stored at the NAC system 180, the NMS 130 may provide the configuration information to the NAC system 180. The NAC system 180 may send a Server Hello, including a server certificate from the configuration information for the organization back to NAS device 108. The NAC system 180 may request a client certificate from the NAS device 108, and the NAS device 108 may respond with the client certificate. NAC system 180 may then validate the client certificate at the organization's Certificate Authority, as indicated by the configuration information for the organization identified by the SNI. The NAC system 180 and NAS device 108 may then establish a secure tunnel.

As described above, the NAC system 180 may use the identifier to identify the organization that the NAS device 108A is associated with. The NAC system 180 and the NMS 130 may store organization-specific configuration information based on the identifier. Each NAC system 180 only needs to store the configuration information for the organizations that it is currently serving. The NAC system 180 need not permanently store configuration information for each organization; the NAC system 180 may use the identifier to request and download the organization configuration from the NMS 130 as needed (referred to as a "lazy download"). In this way, all configuration information for all organizations does not need to reside in every NAC system 180. Instead, each NAC system 180 may store the client-specific configuration information only for those organizations for which the respective NAC system 180 provides NAC service. Based on inactivity, the organization configuration information may age out and be discarded from the cloud memory of the NAC system 180

Figure 7:
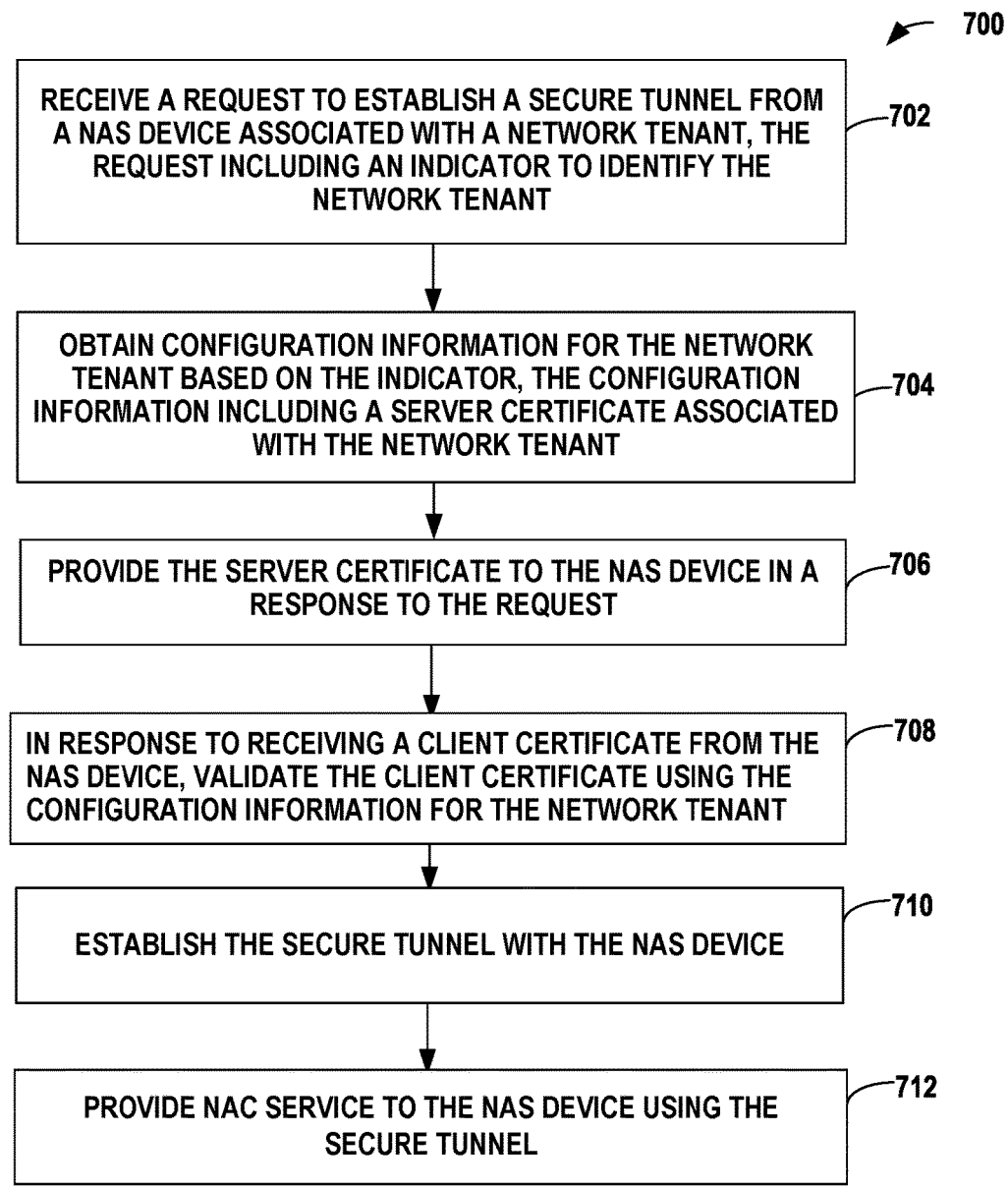
FIG. 7 is a flow chart illustrating an example operation for identification and validation of a tenant or organization to which a network access server device belongs in the context of a multi-tenant, cloud-hosted network access control system, in accordance with one or more techniques of this disclosure.

FIG. 7 is a flow chart illustrating an example operation for identification and validation of a tenant or organization to which a NAS device 108 belongs in the context of a multi-tenant, cloud-hosted NAC system 180 in accordance with one or more techniques of this disclosure. The example operation of FIG. 7 is described herein with respect to NMS 130 and NAC systems 180 of FIGS. 1A-C. In other examples, the operation of FIG. 7 may be performed by other computing systems or devices.

NAC system 180A receives a request to establish a secure tunnel from a NAS device 108A of the plurality of NAS devices 108 associated with a network tenant of the one or more network tenants, and the request includes an indicator to identify the network tenant to which the NAS device 108A belongs (702). NAS devices 108 may include any network infrastructure devices that authenticate and authorize client devices to access an enterprise network, such as access points, switches, and routers. The network tenants may correspond to different organizations or groups. The secure tunnel may be a TLS (Transport Layer Security) tunnel. The NAC system may provide RADIUS (Remote Authentication Dial-In User Service) service to the NAS device, and the TLS tunnel may be a RADSEC (RADIUS over TLS) tunnel. The request may be a "Client Hello" message. The indicator may be a server name indication (SNI) field of the "Client Hello" message.

NAC system 180A obtains configuration information for the network tenant based on the indicator, and the configuration information includes a server certificate associated with the network tenant (704). To obtain the configuration information for the network tenant, the NAC system 180A may perform a lookup in a local cache of configuration information using the indicator to identify the network tenant. Based on a successful lookup operation, the configuration information for the network tenant may be obtained from the local cache. Based on an unsuccessful lookup operation, the configuration information for the network tenant may be obtained from NMS 130 with the indicator to identify the network tenant.

The NAC system 180A may clear the configuration information for the network tenant from the local cache if the configuration information is not used in a predetermined time period. The NMS 130 may provide configuration information updates to the NAC system 180A. The NAC system 180A may update the local cache using the configuration information updates.

The NMS 130 may determine whether to provide the configuration information for the network tenant to the NAC system using a policy associated with the network tenant. The policy may include restrictions on providing the configuration information to the NAC system based on the physical location of the NAC system.

NAC system 180A provides the server certificate to the NAS device 108A in a response to the request (706). The NAC system 180A may include the server certificate in a Server Hello message. NAC system 180A may request a client certificate from the NAS device 108A. This request may be part of an extension to the TLS handshake. NAC system 180A may receive the client certificate from the NAS device 108A. NMS 130 may provision the NAS device 108A with the indicator and the client certificate before the initial request for the secure tunnel is received by the NAC system 180A.

In response to receiving a client certificate from the NAS device 108A, NAC system 180A validates the client certificate using the configuration information for the network tenant (708). The configuration information may indicate a certificate authority (CA) associated with the network tenant. The NAC system 180A may use the CA associated with the network tenant to validate the client certificate received from the NAS device 108A. The NMS 130 may maintain the CA associated with the network tenant, or the CA associated with the network tenant may be at another location.

NAC system 180A establishes the secure tunnel with the NAS device (710). The secure tunnel may be a TLS tunnel, such as a RADSEC (RADIUS over TLS) tunnel. NAC system 180 provides NAC service to the NAS device 108A using the secure tunnel. (712). NAC services may include providing access to Authentication, Authorization and Accounting (AAA) services for authenticating users.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
 a cloud-based network management system (NMS) configured to manage a plurality of network access server (NAS) devices associated with one or more network tenants; and
 one or more cloud-based network access control (NAC) systems in communication with the NMS, at least one NAC system of the one or more NAC systems configured to:
  receive a request to establish a secure tunnel from a NAS device of the plurality of NAS devices associated with a network tenant of the one or more network tenants, the request including an indicator to identify the network tenant to which the NAS device belongs;

obtain configuration information for the network tenant based on the indicator, the configuration information including a server certificate and access policies associated with the network tenant;

provide the server certificate to the NAS device in a response to the request;

in response to receipt of a client certificate from the NAS device, validate the client certificate using the configuration information for the network tenant;

establish the secure tunnel with the NAS device; and provide NAC service to the NAS device using the secure tunnel in accordance with the access policies included in the obtained configuration information for the network tenant.

2. The system of claim 1, wherein the secure tunnel comprises a TLS (Transport Layer Security) tunnel, wherein the request to establish the secure tunnel comprises a "Client Hello" message, and wherein the indicator comprises a server name indication (SNI) field of the "Client Hello" message.

3. The system of claim 2, wherein the NAC system is configured to provide RADIUS (Remote Authentication Dial-In User Service) service to the NAS device and wherein the TLS tunnel is a RADSEC (RADIUS over TLS) tunnel.

4. The system of claim 1, wherein to obtain the configuration information for the network tenant, the NAC system is configured to:

perform a lookup in a local cache of configuration information using the indicator to identify the network tenant; and based on a successful lookup operation, obtain the configuration information for the network tenant from the local cache.

5. The system of claim 4, wherein the NAC system is configured to clear the configuration information for the network tenant from the local cache if the configuration information is not used in a predetermined time period.

6. The system of claim 4, wherein the NMS is configured to provide configuration information updates to the NAC system, and wherein the NAC system is configured to update the local cache using the configuration information updates.

7. The system of claim 1, wherein to obtain the configuration information for the network tenant, the NAC system is configured to:

perform a lookup in a local cache of configuration information using the indicator to identify the network tenant; and based on an unsuccessful lookup operation, obtain the configuration information for the network tenant from the NMS based on the indicator to identify the network tenant.

8. The system of claim 7, wherein the NMS is configured to determine whether to provide the configuration information for the network tenant to the NAC system using a policy associated with the network tenant.

9. The system of claim 8, wherein the policy includes restrictions on providing the configuration information to the NAC system based on a physical location of the NAC system.

10. The system of claim 1, wherein the NMS is configured to provision the NAS device with the indicator and with the client certificate before the request for the secure tunnel is received by the NAC system.

11. The system of claim 1, wherein the configuration information includes an indication of a certificate authority (CA) associated with the network tenant, and wherein the NAC system is configured to use the CA associated with the network tenant to validate the client certificate received from the NAS device.

12. The system of claim 11 wherein the NMS is configured to maintain the CA associated with the network tenant.

13. A method comprising:

receiving, at a cloud-based network access control (NAC) system in communication with a cloud-based network management system (NMS), a request to establish a secure tunnel from a network access server (NAS) device of a plurality of NAS devices associated with one or more network tenants, the request including an indicator to identify a network tenant of the one or more network tenants to which the NAS device belongs;

obtaining, by the NAC system, configuration information for the network tenant based on the indicator, the configuration information including a server certificate and access policies associated with the network tenant;

providing, by the NAC system, the server certificate to the NAS device in a response to the request;

in response to receiving a client certificate from the NAS device, validating, by the NAC system, the client certificate using the configuration information for the network tenant;

establishing, by the NAC system, the secure tunnel with the NAS device; and providing, by the NAC system, NAC service to the NAS device using the secure tunnel in accordance with the access policies included in the obtained configuration information for the network tenant.

14. The method of claim 13, wherein the secure tunnel comprises a TLS (Transport Layer Security) tunnel, wherein the request to establish the secure tunnel comprises a "Client Hello" message, and wherein the indicator comprises a server name indication (SNI) field of the "Client Hello" message.

15. The method of claim 13, wherein obtaining the configuration information for the network tenant comprises:

performing a lookup in a local cache of configuration information using the indicator to identify the network tenant; and based on a successful lookup operation, obtaining the configuration information for the network tenant from the local cache.

16. The method of claim 13, wherein obtaining the configuration information for the network tenant comprises:

performing a lookup in a local cache of configuration information using the indicator to identify the network tenant; and based on an unsuccessful lookup operation, obtaining the configuration information for the network tenant from the NMS based on the indicator to identify the network tenant.

17. The method of claim 16, further comprising determining, by the NMS, whether to provide the configuration information to the NAC system using a policy associated with the network tenant.

18. The method of claim 17, wherein the policy includes restrictions on providing the configuration information to the NAC system based on a physical location of the NAC system.

19. The method of claim 13, wherein the configuration information includes an indication of a certificate authority (CA) associated with the network tenant, wherein validating the client certificate comprises validating the client certificate received from the NAC system using the CA associated with the network tenant.

20. A non-transitory computer-readable storage medium comprising instructions that, when executed, cause one or more processors of a cloud-based network access control (NAC) system in communication with a cloud-based network management system (NMS) to:
  receive a request to establish a secure tunnel from a network access server (NAS) device of a plurality of NAS devices associated with one or more network tenants, the request including an indicator to identify a network tenant of the one or more network tenants to which the NAS device belongs;
  obtain configuration information for the network tenant based on the indicator, the configuration information including a server certificate and access policies associated with the network tenant;
  provide the server certificate to the NAS device in a response to the request;
  in response to receipt of a client certificate from the NAS device, validate the client certificate using the configuration information for the network tenant;
  establish the secure tunnel with the NAS device; and
  provide NAC service to the NAS device using the secure tunnel in accordance with the access policies included in the obtained configuration information for the network tenant.

* * * * *